(12) United States Patent
Aoyama et al.

(10) Patent No.: US 9,097,315 B2
(45) Date of Patent: Aug. 4, 2015

(54) CONTROL DEVICE AND CONTROL METHOD FOR CONTINUOUSLY VARIABLE TRANSMISSION

(71) Applicant: JATCO LTD, Fuji-shi, Shizuoka (JP)

(72) Inventors: Noritaka Aoyama, Okazaki (JP); Hideshi Wakayama, Hadano (JP); Naohiro Yamada, Atsugi (JP); Keichi Tatewaki, Atsugi (JP); Kousuke Waku, Hadano (JP)

(73) Assignee: JATCO LTD, Fuji-shi (JP)

( * ) Notice: Subject to any disclaimer, the term of this patent is extended or adjusted under 35 U.S.C. 154(b) by 299 days.

(21) Appl. No.: 13/790,201

(22) Filed: Mar. 8, 2013

(65) Prior Publication Data

US 2013/0260929 A1    Oct. 3, 2013

(30) Foreign Application Priority Data

Mar. 28, 2012    (JP) .................................. 2012-75021

(51) Int. Cl.
| | |
|---|---|
| *F16H 9/16* | (2006.01) |
| *B60W 10/06* | (2006.01) |
| *B60W 30/18* | (2012.01) |
| *F16H 61/662* | (2006.01) |

(52) U.S. Cl.
CPC ................. *F16H 9/16* (2013.01); *B60W 10/06* (2013.01); *B60W 30/18072* (2013.01); *F16H 61/66272* (2013.01)

(58) Field of Classification Search
CPC ............ B60W 30/18072; B60W 10/06; F16H 61/66272; F16H 9/16
USPC .................... 474/8–29; 477/39, 45, 115, 175
See application file for complete search history.

(56) References Cited

U.S. PATENT DOCUMENTS

| | | | |
|---|---|---|---|
| 7,678,016 | B2 | 3/2010 | Nakayama |
| 2007/0184936 | A1 | 8/2007 | Nakayama |
| 2011/0136620 | A1* | 6/2011 | Gibson et al. .................. 477/64 |
| 2012/0088629 | A1* | 4/2012 | Aoyama et al. ................ 477/39 |
| 2012/0135840 | A1* | 5/2012 | Tatewaki et al. .............. 477/115 |
| 2012/0135841 | A1* | 5/2012 | Watanabe et al. ............. 477/115 |
| 2012/0142494 | A1* | 6/2012 | Yamada et al. ................ 477/175 |
| 2013/0150208 | A1* | 6/2013 | Wakayama et al. ............ 477/68 |
| 2013/0151129 | A1* | 6/2013 | Tatewaki et al. ............. 701/112 |
| 2013/0245923 | A1* | 9/2013 | Matsuda et al. ............. 701/110 |
| 2013/0260960 | A1* | 10/2013 | Aoyama et al. ................ 477/45 |

FOREIGN PATENT DOCUMENTS

| | | |
|---|---|---|
| JP | 2005-226802 A | 8/2005 |
| JP | 2007-205529 A | 8/2007 |
| JP | 2011-106655 A | 6/2011 |

* cited by examiner

*Primary Examiner* — William E Dondero
*Assistant Examiner* — Robert T Reese
(74) *Attorney, Agent, or Firm* — Foley & Lardner LLP

(57) ABSTRACT

The present invention is provided with a hydraulic control circuit including a hydraulic pump driven by a driving power source in order to supply an oil pressure to a hydraulic circuit, a hydraulic auxiliary unit for supplying an accumulated oil pressure to the hydraulic circuit, and a control valve for supplying at least one of oil pressures of the hydraulic pump and the hydraulic auxiliary unit to pulleys, and a control unit for executing a coast stop control to stop the driving power source while traveling and controlling, when an increase of torque inputted to the continuously variable transmission is detected or predicted during the coast stop control, the control valve so as to supply an oil pressure of the hydraulic auxiliary unit to the pulleys.

11 Claims, 9 Drawing Sheets

CONTROL DEVICE AND CONTROL METHOD FOR CONTINUOUSLY VARIABLE TRANSMISSION

TECHNICAL FIELD OF THE INVENTION

The present invention relates to a control device for continuously variable transmission in which a belt is prevented from slipping.

BACKGROUND OF THE INVENTION

Oil pressure generated in a mechanical oil pump driven by the engine is supplied to a belt-type continuously variable transmission. Pulley pressures (including a primary pulley pressure and a secondary pulley pressure) generated by using the oil pressure as a source pressure are supplied to a primary pulley and a secondary pulley. These pulley pressures are used to hold a belt and these pulley pressures are controlled to change a groove width in each of the pulleys in order to realize a shift.

JP2005-226802A describes that, in such a continuously variable transmission, in making an idle stop of the engine, it is discontinued to drive a mechanical oil pump and allows no supply of an oil pressure. In order to avoid this situation, there has been known an accumulator for accumulating an oil pressure in order to supply an oil pressure of the accumulator in an idle stop.

SUMMARY OF THE INVENTION

According to JP2005-226802A, an oil pressure of an accumulator is supplied in an idle stop of the engine in a state where a vehicle is standing still. In recent years, a so-called coast stop control has been carried out to suspend the engine not only when a vehicle stops but also before a vehicle stops in order to improve fuel efficiency performance of the engine.

While a vehicle is traveling, torque relating to vehicle traveling may be possibly inputted to a continuously variable transmission even when, for example, the vehicle travels at a low speed immediately before coming to a halt. For instance, large torque is inputted resulting from further stepping on a brake by a driver and riding on a bump or other circumstances.

At this time, in a circumstance where only an oil pressure accumulated in an accumulator is supplied without rotation of a mechanical oil pump due to a coast stop control, it may not be possible to ensure sufficient pulley pressures to hold a belt by overcoming torque and a problem arises with belt slippage.

The present invention was achieved in view of such a problem and aims at providing a control device for continuously variable transmission in which belt slippage can be prevented even in suspension of the engine in such an occasion as a coast stop control.

According to one embodiment of the present invention, a control device for continuously variable transmission is mounted on a vehicle and applied by having a continuously variable transmission mechanism which is capable of changing a speed ratio by changing a winding diameter of a belt held by an oil pressure supplied to pulleys. The control device is characterized by having a hydraulic control circuit including a hydraulic pump which is driven by a driving power source in order to supply an oil pressure to a hydraulic circuit, a hydraulic auxiliary unit capable of supplying an accumulated oil pressure to the hydraulic circuit, and a control valve for supplying at least one of oil pressures of the hydraulic pump and the hydraulic auxiliary unit to the pulleys, and a control unit for executing a coast stop control to stop the driving power source while traveling and controlling, when an increase of torque inputted to the continuously variable transmission is detected or predicted in the coast stop control, the control valve so that an oil pressure of the hydraulic auxiliary unit is supplied to the pulleys.

The details as well as other features and advantages of this invention are set forth in the remainder of the specification and are shown in the accompanying drawings.

DESCRIPTION OF THE PREFERRED EMBODIMENTS

Figure 1:
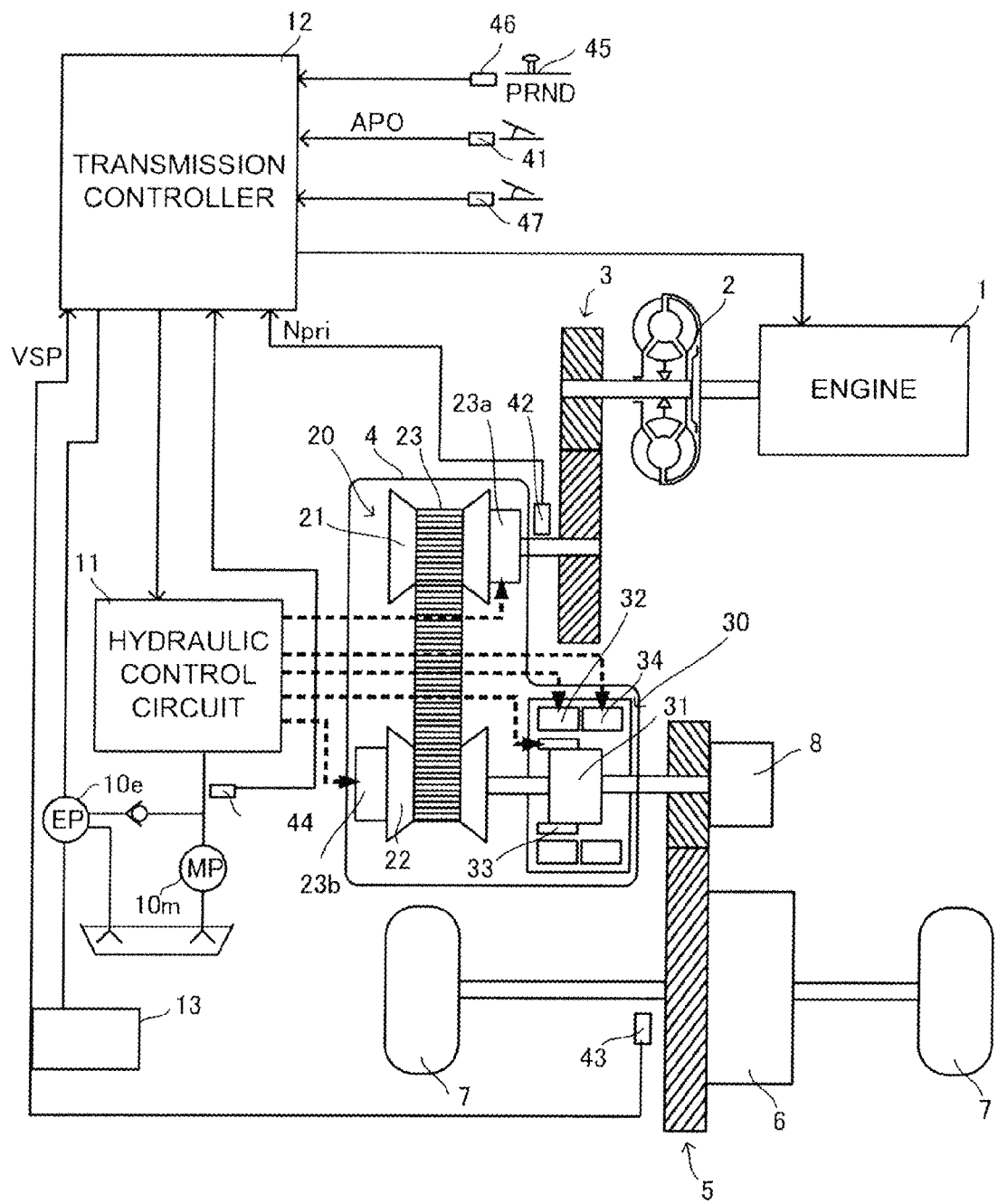
FIG. 1 is a schematic configuration diagram of a vehicle equipped with a control device for a continuously variable transmission according to the present embodiment is mounted.

FIG. 1 is a schematic configuration diagram of a vehicle equipped with a control device for a continuously variable transmission according to a first embodiment of the present invention is mounted. This vehicle is provided with an engine 1 serving as a power source. Rotation outputted by the engine 1 is transmitted to driving wheels 7 via a torque converter 2 having a lock-up clutch, a first gear train 3, a continuously variable transmission (simply referred to as a "transmission 4" hereinafter), a second gear train 5 and a final reduction gear 6. The second gear train 5 is provided with a parking mechanism 8 for mechanically locking an output shaft of the transmission 4 to be non-rotatable in parking.

The vehicle is also provided with a mechanical oil pump 10m which receives rotation of the engine 1 and is driven by using a part of power of the engine 1, and an electric oil pump 10e driven in response to power supplied from a battery 13. The transmission 4 is also provided with a hydraulic control circuit 11 for regulating an oil pressure supplied from at least one of the mechanical oil pump 10m and the electric oil pump 10e in order to supply to each part of the transmission 4, and a controller 12 for controlling the hydraulic control circuit 11 and the engine 1.

Each component will be explained as follows. The transmission 4 is provided with a continuously variable transmission mechanism (referred to as a "variator 20" hereinafter), and an auxiliary transmission mechanism 30 arranged in series to the variator 20. The expression "arranged in series" means serial arrangement of the variator 20 and the auxiliary transmission mechanism 30 on the same power transmission path. The auxiliary transmission mechanism 30 may be directly connected to an output shaft of the variator 20 as shown in this example or may also be connected thereto via another shift or power transmitting mechanism (e.g. gear train).

The variator 20 is a belt-type continuously variable transmission mechanism, including a primary pulley 21, a secondary pulley 22 and a V belt 23 which is wound around these pulleys 21 and 22. Each of the pulleys 21 and 22 has a fixed conical plate, movable conical plates arranged by making sheave surfaces to oppose the fixed conical plate so as to form V grooves in a space created with the fixed conical plate, and a hydraulic cylinder 23a or 23b arranged on a rear surface of the movable conical plate to allow displacement of the movable conical plates in the shaft direction. By adjusting an oil pressure supplied to the hydraulic cylinders 23a and 23b, the width of the V grooves is varied to change a contact radius between the V belt 23 and each of the pulleys 21 and 22, whereby allowing a continuous change of a speed ratio vRatio of the variator 20.

The auxiliary transmission mechanism 30 is a transmission mechanism to realize two forward stages and one reverse stage. The auxiliary transmission mechanism 30 is provided with a Ravigneaux-type planetary gear mechanism 31 in which two planetary gear carriers are connected to each other, and a plurality of friction engagement elements (i.e. a Low brake 32, a High clutch 33 and a Rev brake 34) that are connected to a plurality of rotating elements to constitute the Ravigneaux-type planetary gear mechanism 31 and change a linkage of these rotating elements. By adjusting an oil pressure supplied to each of the friction engagement elements 32 to 34 and making a change in the engaged/released state of each of the friction engagement elements 32 to 34, a shift stage is changed in the auxiliary transmission mechanism 30. For example, by fastening the Low brake 32 and releasing the High clutch 33 and the Rev brake 34, the shift stage of the auxiliary transmission mechanism 30 is brought into a first speed. By fastening the High clutch 33 and releasing the Low brake 32 and the Rev brake 34, the shift stage of the auxiliary transmission mechanism 30 is brought into a second speed whose speed ratio is less than that of the first speed. By fastening the Rev brake 34 and releasing the Low brake 32 and the High clutch 33, the shift stage of the auxiliary transmission mechanism 30 is reversed.

Figure 2:
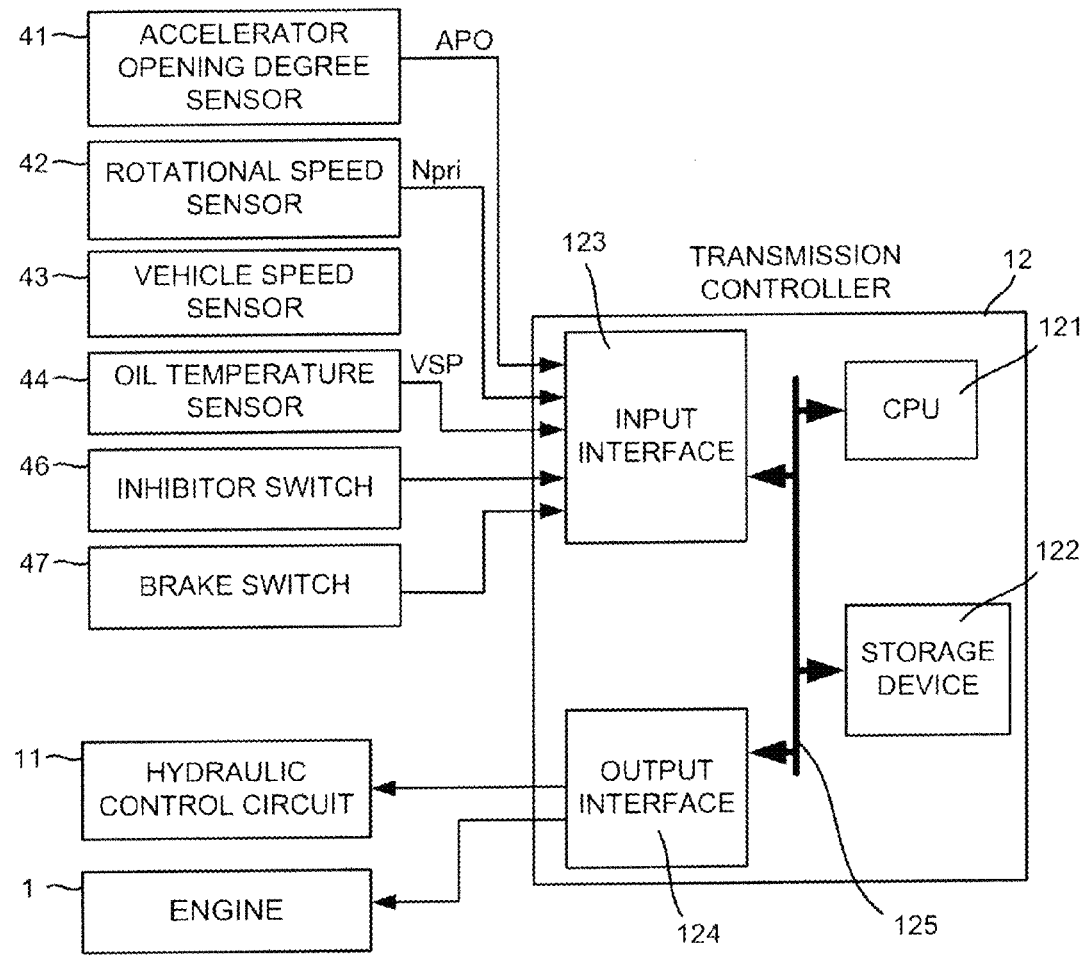
FIG. 2 is an explanatory diagram showing an example of a structure of a transmission control device according to the embodiment of the present invention.

As shown in FIG. 2, the transmission controller 12 is composed of a CPU 121, a storage device 122 made of RAM/ROM, an input interface 123, an output interface 124 and a bus 125 by which these components are connected to each other.

The input interface 123 receives a signal outputted from an accelerator opening degree sensor 41 for detecting the degree of opening of an accelerator pedal (referred to as an "accelerator opening degree APO" hereinafter), a signal outputted from a rotational speed sensor 42 for detecting a rotational speed inputted to the transmission 4 (which is equal to a rotational speed of the primary pulley 21 and referred to as a "primary rotational speed Npri" hereinafter), a signal outputted from a vehicle speed sensor 43 for detecting a running speed of the vehicle (referred to as a "vehicle speed VSP" hereinafter), a signal outputted from an oil temperature sensor 44 for detecting an oil temperature of the transmission 4, and a signal outputted from an inhibitor switch 46 for detecting the position of a select lever, or other signals.

The storage device 122 stores a shift control program for the transmission 4 and a shift map used in the shift control program. The CPU 121 reads and executes the shift control program stored in the storage device 122, generates shift control signals by applying various kinds of arithmetic processes to various kinds of signals inputted via the input interface 123, and outputs generated shift control signals to the hydraulic control circuit 11 via the output interface 124. Various kinds of values used by the CPU 121 in arithmetic processes and arithmetic results obtained therefrom are appropriately stored in the storage device 122.

The hydraulic control circuit 11 is composed of a plurality of flow paths and a plurality of hydraulic control valves. Based on a shift control signal sent from the transmission controller 12, the hydraulic control circuit 11 switches paths to supply an oil pressure by controlling the plurality of the hydraulic control valves, and prepares a required oil pressure from an oil pressure generated in the oil pump 10 in order to supply to each unit of the transmission 4. Therefore, the speed ratio vRatio of the variator 20 and the shift stage of the auxiliary transmission mechanism 30 are varied to shift the transmission 4.

Figure 3:
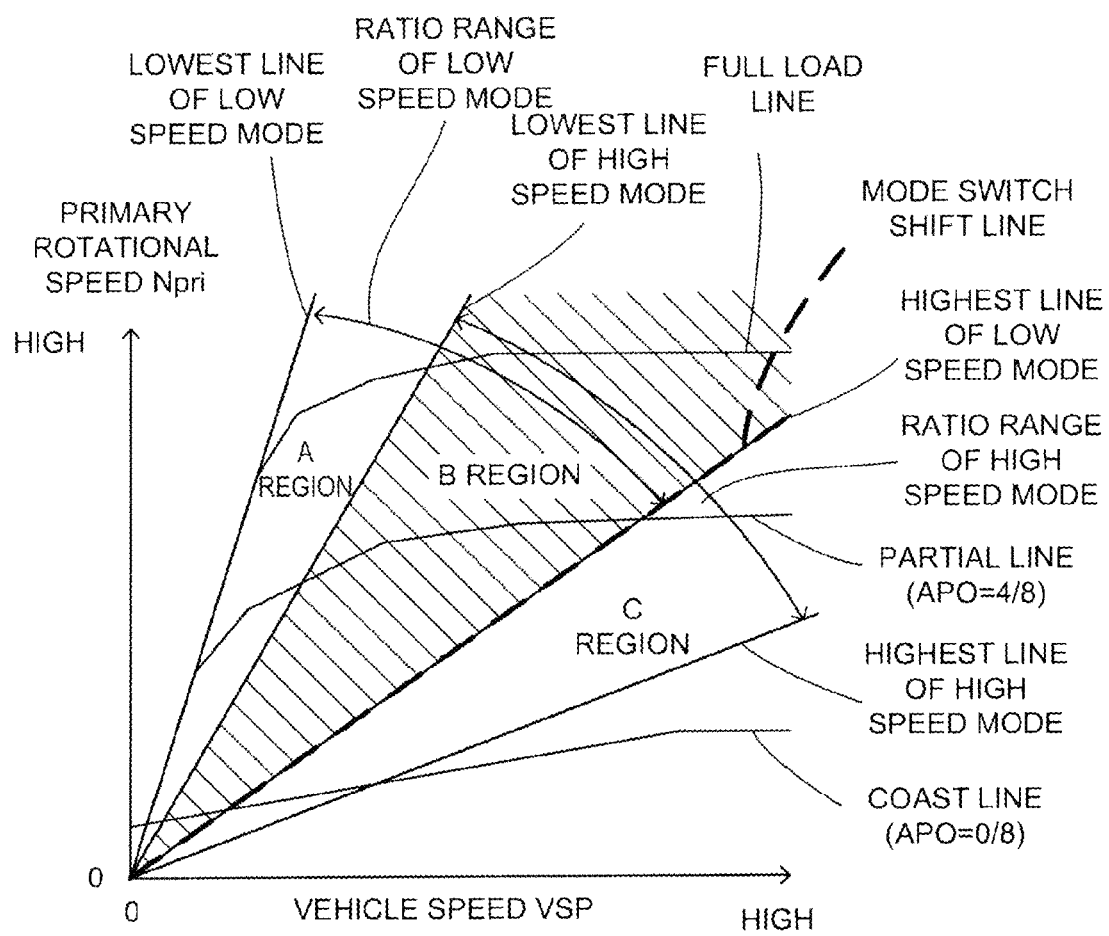
FIG. 3 is an explanatory diagram showing an example of a shift map according to the embodiment of the present invention.

FIG. 3 shows an example of the shift map stored in the storage device 122 of the transmission controller 12.

On the shift map, an operating point of the transmission 4 is determined based on the vehicle speed VSP and the primary rotational speed Npri. The inclination made by a line to connect an operating point of the transmission 4 and zero point at the bottom left corner of the shift map expresses a speed ratio of the transmission 4 (i.e. an entire speed ratio obtained by multiplying a speed ratio subRatio of the auxiliary transmission mechanism 30 to the speed ratio vRatio of the variator 20, referred to as a "through speed ratio Ratio" hereinafter). The shift map includes, similar to the shift map of the conventional belt-type continuously variable transmission, a shift line set for each value of the accelerator opening degree APO and the transmission 4 is shifted according to a shift line which is selected in proportion to the accelerator opening degree APO. For simplification, FIG. 3 includes only a full load line (i.e. shift line obtained when the accelerator opening degree APO falls in 8/8), a partial line (i.e. shift line obtained when the accelerator opening degree APO falls in 4/8) and a coast line (i.e. shift line obtained when the accelerator opening degree APO falls in 0).

When the transmission 4 operates in a low speed mode, the transmission 4 can be shifted in a range between the lowest line of the low speed mode, which is obtained by setting the speed ratio vRatio of the variator 20 to a maximum degree, and the highest line of the low speed mode, which is obtained by setting the speed ratio vRatio of the variator 20 to a minimum degree. At this time, the transmission 4 has an operating point which moves within A region and B region. In contrast, when the transmission 4 operates in a high speed mode, the transmission 4 can be shifted in a range between the lowest line of the high speed mode, which is obtained by setting the speed ratio vRatio of the variator 20 to a maximum degree, and the highest line of the high speed mode, which is obtained by setting the speed ratio vRatio of the variator 20 to a minimum degree. At this time, the transmission 4 has an operating point which moves within B region and C region.

A speed ratio in each shift stage of the auxiliary transmission mechanism 30 is set so that a speed ratio corresponding to the highest line of the low speed mode (i.e. highest speed ratio in the low speed mode) is less than a speed ratio corresponding to the lowest line of the high speed mode (i.e. lowest speed ratio in the high speed mode). Therefore, a low speed mode ratio range which is a range allowed for the through speed ratio Ratio of the transmission 4 to occupy in the low speed mode is partially overlapped by a high speed mode ratio range which is a range allowed for the through speed ratio Ratio of the transmission 4 to occupy in the high speed mode and when an operating point of the transmission 4 falls in the B region which is interposed between the lowest line of the high speed mode and the highest line of the low speed mode, the transmission 4 is allowed to select either the low speed mode or the high speed mode.

The transmission controller 12 refers to the shift map to set the through speed ratio Ratio corresponding to the vehicle speed VSP and the accelerator opening degree APO (i.e. driving state of the vehicle) as an achieving through speed ratio DRatio. The achieving through speed ratio DRatio is a target value to be finally achieved by the through speed ratio Ratio in the driving state. Then, the transmission controller 12 sets a target through speed ratio tRatio which is a transient target value for use in allowing the through speed ratio Ratio to follow the achieving through speed ratio DRatio corresponding to desired response characteristics, and controls the variator 20 and the auxiliary transmission mechanism 30 so that the through speed ratio Ratio coincides with the target through speed ratio tRatio.

A mode switch shift line for use in shifting the auxiliary transmission mechanism 30 (i.e. shift line 1-2 of the auxiliary transmission mechanism 30) is set to overlap highest line of the low speed mode on the shift map. A through speed ratio corresponding to the mode switch shift line (referred to as a "mode switch speed ratio mRatio" hereinafter) is equal to the highest speed ratio in the low speed mode.

Then, when an operating point of the transmission 4 crosses the mode switch shift line or when the through speed ratio Ratio of the transmission 4 is varied across the mode switch speed ratio mRatio, the transmission controller 12 carries out a mode switch shift control. In the mode switch shift control, the transmission controller 12 shifts the auxiliary transmission mechanism 30 and carries out a coordinated shift to change the speed ratio vRatio of the variator 20 to a direction opposite to a direction to which the speed ratio subRatio of the auxiliary transmission mechanism 30 is varied.

In the coordinated shift, when the through speed ratio Ratio of the transmission 4 is brought into a state of being less than the mode switch speed ratio mRatio from a state of being larger than that, the transmission controller 12 changes the shift stage of the auxiliary transmission mechanism 30 from the first speed to the second speed (referred to as a "1-2 shift" hereinafter) and changes the speed ratio vRatio of the variator 20 to become a larger speed ratio. In contrast, when the through speed ratio Ratio of the transmission 4 is brought into a state of being larger than the mode switch speed ratio mRatio from a state of being less than that, the transmission controller 12 changes the shift stage of the auxiliary transmission mechanism 30 from the second speed to the first speed (referred to as a "2-1 shift" hereinafter) and changes the speed ratio vRatio of the variator 20 to become a smaller variation ratio.

The reason why the coordinated shift is carried out in the mode switch shifting is to suppress a sense of incompatibility felt by a driver resulting from a change of inputted rotation caused by a stage difference of the through speed ratio Ratio of the transmission 4. The reason why the mode switch shifting is carried out when the speed ratio vRatio of the variator 20 falls in the highest speed ratio is because torque inputted to the auxiliary transmission mechanism 30 is at the minimum in this state under torque inputted to the variator 20 at this time and shifting the auxiliary transmission mechanism 30 in this state makes it possible to alleviate a shift shock of the auxiliary transmission mechanism 30.

According to the shift map, when the vehicle is parked, the speed ratio vRatio of the variator 20 is brought into the lowest speed ratio and the shift stage of the auxiliary transmission mechanism 30 is set to the first speed.

The controller 12 of the present embodiment executes a coast stop control to suspend rotation of the engine 1 even when the vehicle is traveling, in addition to an idle stop control to suspend rotation of the engine 1 even when the vehicle is standing still, in order to suppress fuel consumption.

The coast stop control is a control to suppress fuel consumption by automatically suspending the engine 1 while the vehicle is traveling in a low vehicle speed range. The coast stop control is common to a fuel cut control, which is executed when an accelerator is turned off, in terms of suspending fuel supply but there is a difference in terms of that, as opposed to the usual fuel cut control which is executed when the vehicle is traveling at relatively high speed and accompanied by engagement of the lock-up clutch of the torque converter 2 in order to ensure an engine brake, the coast stop control is executed when the vehicle is traveling at relatively low speed immediately before coming to a halt and stops rotation of the engine 1 by releasing the lock-up clutch.

In execution of the coast stop control, the controller 12 initially determines whether or not, for example, the following conditions a) to d) are met:
a) Accelerator pedal is detached from the foot (accelerator opening degree APO=0);
b) Brake pedal is stepped on (the brake switch 47 is turned on);
c) Vehicle speed is equal to or less than a predetermined low vehicle speed (e.g. 15 km/h); and
d) Lock-up clutch is released.

These conditions can also be paraphrased as conditions to judge a driver intends to stop the vehicle.

When the coast stop conditions are met, the controller 12 stops rotation of the engine 1 by suspending fuel supply to the engine 1.

Figure 4:
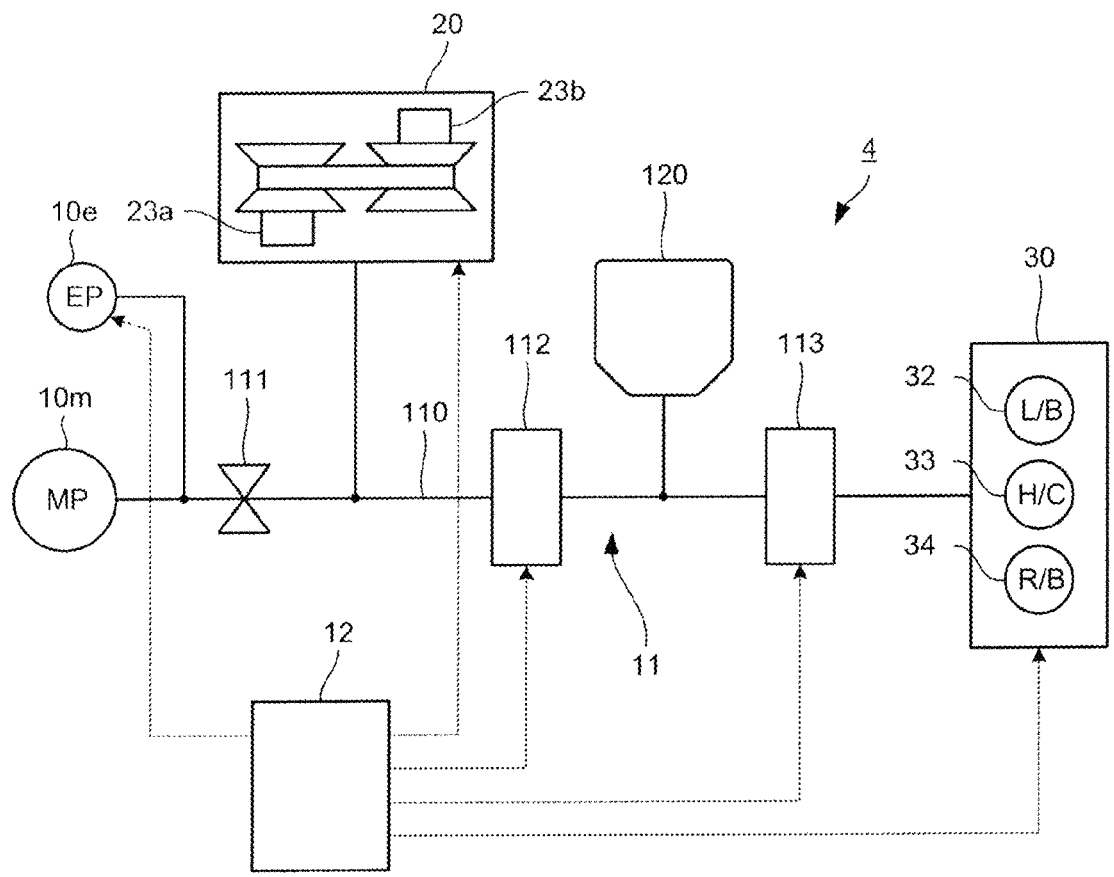
FIG. 4 is an explanatory diagram of a transmission including a hydraulic control circuit according to the embodiment of the present invention.

Next, how the hydraulic control circuit 11 is configured and operates will be explained. FIG. 4 is an explanatory diagram of the transmission 4 including the hydraulic control circuit 11 according to the embodiment of the present invention.

The hydraulic control circuit 11 is composed of an oil passage 110. The oil passage 110 is connected to a check valve 111, the hydraulic cylinders (i.e. the hydraulic cylinders 23a and 23b) of the variator 20, an accumulator 120, the friction engagement elements (i.e. the low brake 32, the high clutch 33 and the rev brake 34) of the auxiliary transmission mechanism 30, a first accumulator valve 112 and a second accumulator valve 113. An oil pressure is supplied to the oil passage 110 from at least one of the mechanical oil pump 10m and the electric oil pump 10e.

The check valve 111 supplies the oil passage 110 oil pressures supplied from the mechanical oil pump 10m and the electric oil pump 10e and restricts a flow of hydraulic oil to an opposite direction. The accumulator 120 is configured as a hydraulic auxiliary unit to accumulate hydraulic oil for the oil passage 110 according to a predetermined oil pressure and supply accumulated hydraulic oil to the oil passage 110.

The accumulator 120 is, for example, divided into an oil chamber and an air chamber by a diaphragm, in which a gas pressure sealed in the air chamber is used to accumulate hydraulic oil stored in the oil chamber. It may also be configured to retain an oil pressure by an elastic body such as a spring and a piston which is energized by an energizing force of the elastic body, in place of the diagram and the air chamber.

Each of the first accumulator valve 112 and the second accumulator valve 113 is composed of, for example, a solenoid valve and opening degrees thereof are controlled by a duty control made by the controller 12. By this control, an oil pressure circulates through the first accumulator valve 112 and the second accumulator valve 113 is controlled. As will be explained later, in response to reduction of an oil pressure supplied from the mechanical oil pump 10m, opening degrees of the first accumulator valve 112 and the second accumulator valve 113 are controlled to supply an oil pressure of the accumulator 120 to the variator 20 and the auxiliary transmission mechanism via the oil passage 110. Thus, a control valve for changing a destination to supply an oil pressure in the oil passage 110 is configured by the first accumulator valve 112 and the second accumulator valve 113.

Next, a control made in a coast stop for the vehicle which is thus configured will be explained.

As stated above, the controller 12 stops rotation of the engine 1 by suspending fuel supply to the engine 1 when the coast stop conditions are et. At this time, the mechanical oil pump 10m for generating an oil pressure by a driving force of the engine 1 gradually stops to discontinue supply of an oil pressure from the mechanical oil pump 10m to the hydraulic control circuit 11.

Oil pressure is required even in suspending the engine 1 in order to maintain a force of each of the pulleys in the variator 20 to hold the belt and fasten the friction engagement elements of the auxiliary transmission mechanism 30. Therefore, when the engine 1 is subjected to a coast stop, the controller 12 allows supply of an oil pressure to the hydraulic control circuit 11 by driving the electric oil pump 10e.

Figure 5:
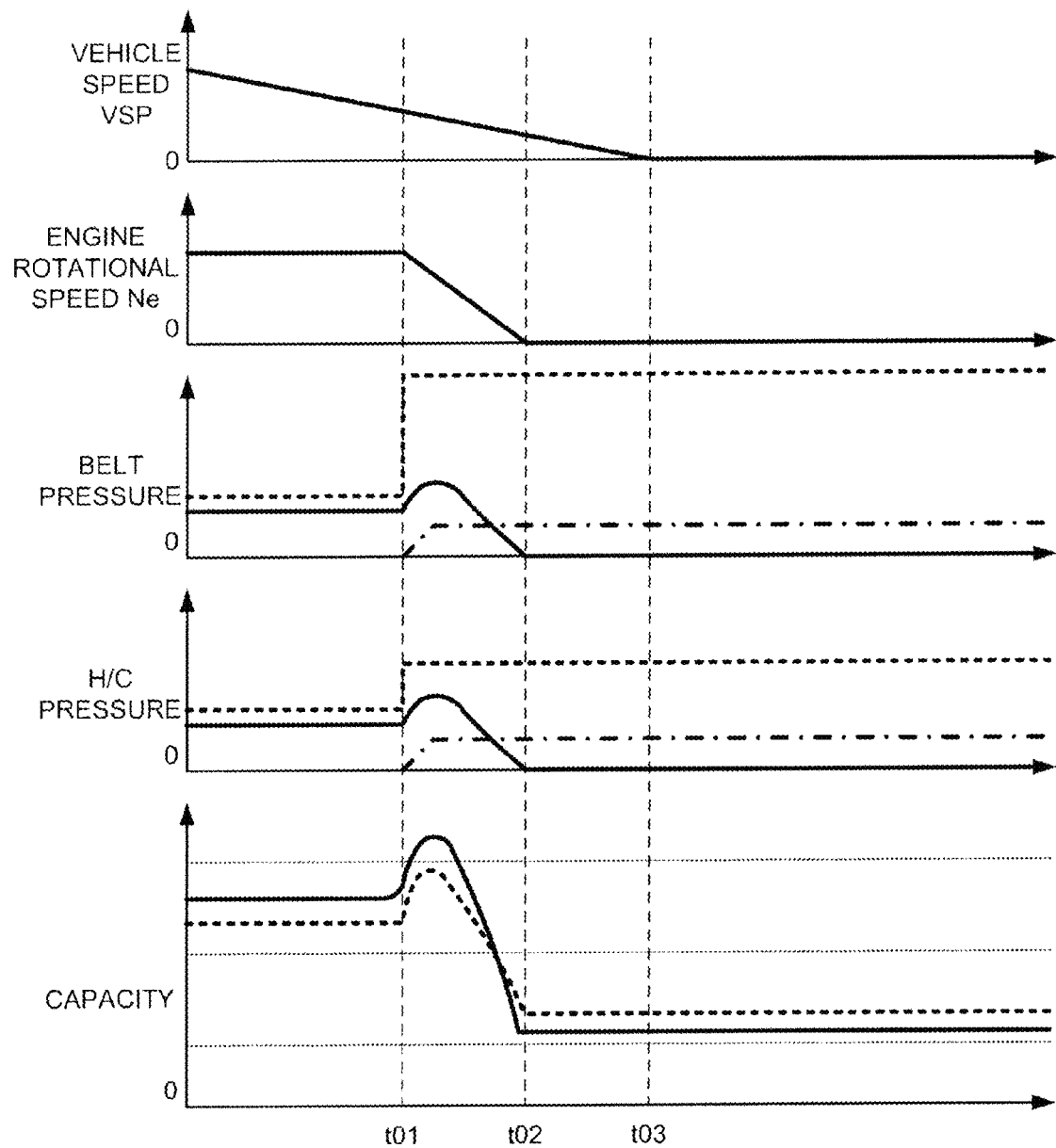
FIG. 5 is an explanatory diagram of a coast stop control according to a comparative example of the present invention.

FIG. 5 is an explanatory diagram of a conventional coast stop control applied to a transmission, showing a comparative example in the present invention.

FIG. 5 shows, from the top, a vehicle speed VSP, an engine rotational speed Ne, an oil pressure to control the second pulley of the variator 20 to hold the belt 23 (referred to as a "belt pressure" hereinafter), an oil pressure to control the high clutch 33 serving as the friction engagement element (referred to as a "H/C pressure" hereinafter), a holding force to hold the belt 23 in the variator 20 (referred to as a "belt capacity" hereinafter), and a force to fasten the high clutch 33 serving as the friction engagement element (referred to as a "H/C capacity" hereinafter).

Here, a belt pressure and a belt capacity of the belt 23 in the secondary pulley 22 will be explained as an example. In the graph of the belt pressure shown in FIG. 5, a broken line refers to an indicated value of an oil pressure, a solid line refers to an actual oil pressure supplied by the mechanical oil pump 10m, and a one-dot chain line refers to an actual oil pressure supplied by the electric oil pump 10e. In the graph of the H/C pressure, a broken line refers to an indicated value of an oil pressure, a solid line refers to an actual oil pressure supplied by the mechanical oil pump 10m, and a one-dot chain line refers to an actual oil pressure supplied by the electric oil pump 10e. In the graph of the capacity, a broken line refers to a belt capacity of the belt 23 and a solid line refers to an H/C capacity of the high clutch 33.

Since a speed ratio in a coast stop is in the vicinity of the lowest value and an oil pressure of the primary pulley 21 is determined according to the secondary pulley 22, only the secondary pulley 22 will be explained here. The friction engagement elements will be explained by using a fastened state of the high clutch 33, which is fastened in a coast stop and transmits power, as an example.

In FIG. 5, when the vehicle decelerates gradually and the coast stop conditions are met (at timing t01), the controller 12 executes a coast stop for the engine 1. Therefore, the engine rotational speed Ne decreases gradually and the engine 1 stops at timing t02. In accordance with a decrease of the engine rotational speed Ne, an oil pressure generated in the mechanical oil pump 10m also decreases.

At the same time as making a coast stop for the engine 1, the controller 12 starts driving the electric oil pump 10e. At this time, the controller 12 sets a larger value (e.g. indicated value of maximum oil pressure) for an indicated pressure applied to the variator 20 and an indicated pressure applied to the friction engagement elements than a value used at and before the start of the coast stop. This is because an oil pressure generated in the electric oil pump 10e is less than that of the mechanical oil pump 10m and in order to make use of an oil pressure of the electric oil pump 10e by setting a large indicated pressure.

Therefore, while the mechanical oil pump 10m is driven in a period from the timing t01 to the timing t02, the belt capacity and the H/C capacity are transiently made larger.

Thereafter, the vehicle comes to a halt and the vehicle speed VSP becomes 0 (at timing t03).

When an oil pressure is supplied by the mechanical oil pump 10m before the engine 1 is subjected to a coast stop, a belt capacity of the variator 20 is less than an H/C capacity of the friction engagement element.

A capacity to fasten the friction engagement elements is generated by bringing the friction members into contact with each other. Therefore, an H/C capacity of the friction engagement element is larger than a belt capacity corresponding to a force to hold the belt in the variator 20 in which the metallic belt and the pulleys are brought into contact with each other by oil. Accordingly, an H/C capacity exceeds a belt capacity at and before the timing t01.

In contrast, in a state with a reduced oil pressure due to suspension of the mechanical oil pump 10, an H/C capacity of the friction engagement element decreases in accordance with the oil pressure and the H/C capacity further decreases in a low oil pressure range due to a return spring. Meanwhile, the variator 20 is configured so as not to reduce a belt capacity in order to prevent slippage of the belt and therefore a belt capacity decreases gently relative to reduction of an oil pressure.

In such a circumstance, particularly when a belt capacity is less than an H/C capacity at transient timings between t01 and t02, an input of large torque to the transmission 4 poses a threat of causing the belt 23 to slip earlier than the high clutch 33.

For example, when a driving force decreases after the start of making a coast stop for the engine 1, there is a case in which large torque is inputted to the transmission 4 due to a sudden change of deceleration resulting from further stepping on a brake. A road surface change (such as riding on a bump) may also result in large torque inputted to the transmission 4. If a belt capacity is less than an H/C capacity when such a large torque is inputted, there is a possibility of causing the belt 23 to slip rather than the high clutch 33.

To cope with such a problem, the accumulator 120 can also be configured to accumulate an oil pressure of the mechanical oil pump 10m and supply an oil pressure to the oil passage when the engine 1 stops and the mechanical oil pump 10m is suspended.

In such a configuration, the following problems can arise under a driving state in which driving the engine 1 is frequently suspended due to an idle stop and a coast stop or other stops.

For example, when the engine 1 is made to restart after suspension and stops again after passing through a short period of time, there is a possibility of resulting in an insufficient oil pressure in suspension of the engine 1 due to a short period of time for the accumulator 120 to be filled with an oil pressure. In this case, if it is impossible to ensure a sufficient holding force of the pulleys (i.e. belt capacity) corresponding to torque inputted to the variator 20, it is feared that the belt 23 may slip.

It can be controlled to suspend the engine 1 only when the accumulator 120 is filled with a sufficient oil pressure, but the accumulator 120 does not have a large capacity to accumulate an oil pressure and therefore the frequency to suspend the engine 1 is reduced, which causes a problem of reduced fuel efficiency performance of the engine.

Therefore, according to the embodiment of the present invention, the following control is made to prevent the belt from slipping and the accumulator 120 is configured so as to be appropriately used.

Figure 6:
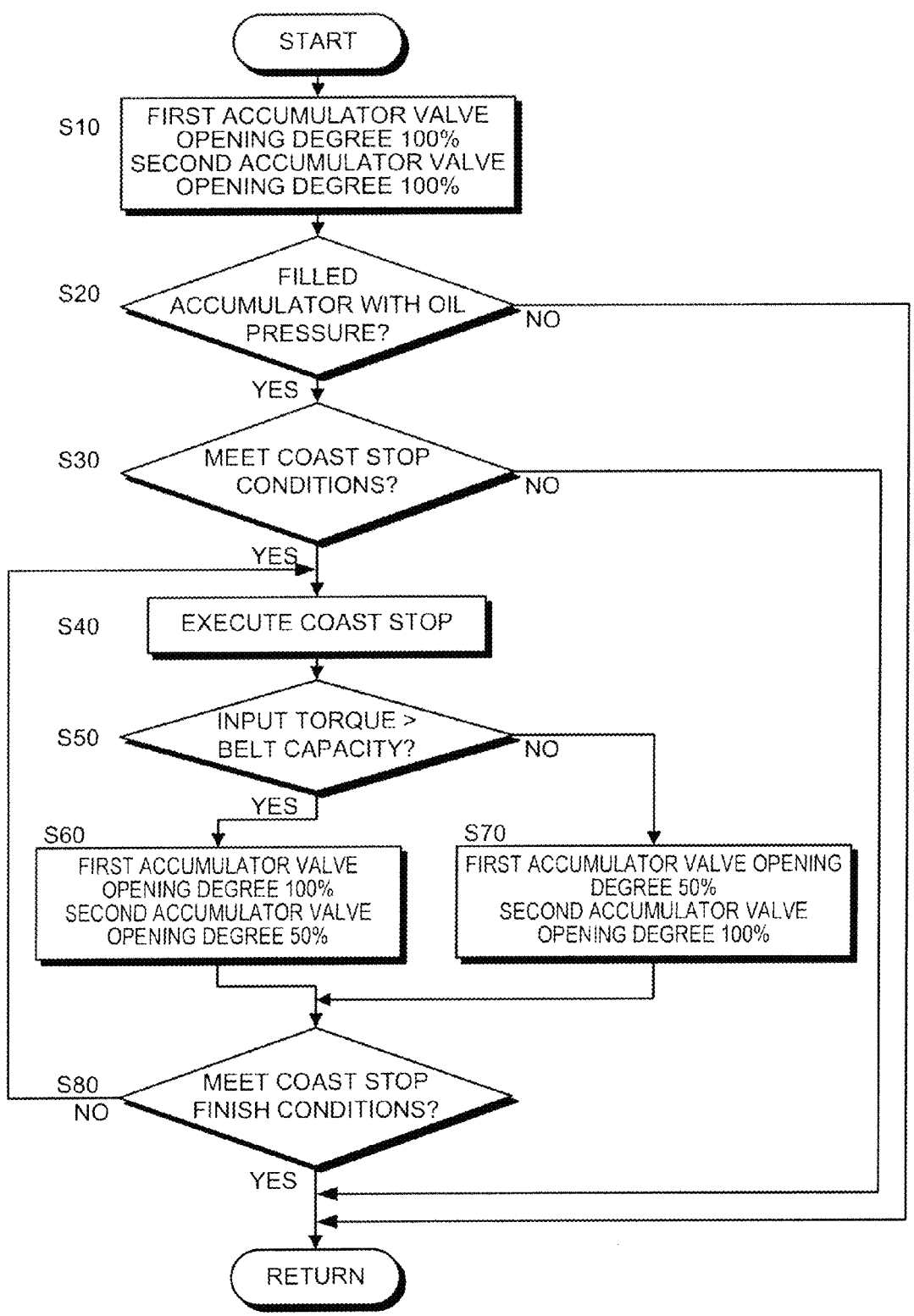
FIG. 6 is a flowchart of a coast stop control according to the embodiment of the present invention.

FIG. 6 is a flowchart to execute a coast stop control by the controller 12 according to the embodiment of the present invention.

When the engine 1 starts (e.g. when the ignition is turned on), the controller 12 starts execution of the flowchart of FIG. 6 and execution is realized according to a predetermined period (e.g. 10 ms).

Firstly, the controller 12 controls opening degrees of the first accumulator valve 112 and the second accumulator valve 113 to the maximum (100%). Therefore, an oil pressure is supplied from the mechanical oil pump 10m to the respective components (i.e. the variator 20, the accumulator 120 and the auxiliary transmission mechanism 30) via the oil passage 110 (S10).

Next, the controller 12 determines whether or not the accumulator 120 is filled with a sufficient oil pressure (S20). For example, an oil pressure sensor may be arranged in the accumulator 120 in order to determine whether or not an oil pressure is equal to or more than a predetermined oil pressure (i.e. line pressure of the oil passage 110), or whether or not the accumulator 120 has been filled with an oil pressure may be determined when a predetermined line pressure or more has been continued for a predetermined period of time by the oil passage 110.

When the accumulator 120 has not been filled with an oil pressure yet, it is impossible to supply a sufficient oil pressure to the oil passage 110 in making a coast stop control and therefore the controller 12 returns to other processes without making a subsequent control.

When the accumulator 120 has been filled with an oil pressure, the process moves onto step S30. In the step S30, the controller 12 determines whether or not the aforementioned coast stop conditions are met. When the coast stop conditions are not met, the controller 12 returns to other processes without making a subsequent control.

When it is determined that the coast stop conditions are met, the process moves onto step S40 in which the controller 12 outputs a command to stop rotation of the engine 1 by controlling the amount of fuel injection and a throttle valve or other factors of the engine 1. At this time, the lockup clutch of the torque converter 2 is released simultaneously so as to provide a converter state in which the engine 1 and the transmission 4 are separated from each other.

Next, the process moves onto step S50, in which the controller 12 determines whether or not torque inputted to the transmission 4 is detected as exceeding a belt capacity or the magnitude of the input torque is predicted as exceeding a belt capacity.

Detecting the magnitude of input torque as exceeding a belt capacity is realized in that, for example, input torque is determined as exceeding or possibly exceeding a belt torque when a brake pedal stepping rate ΔBRKp detected by the brake sensor 47 is larger than a predetermined stepping rate or when a brake hydraulic pressure change rate ΔBRKf detected by the brake sensor 47 is larger than a predetermined change rate.

The controller 12 may also be provided with an acceleration sensor to similarly detect input torque as exceeding a belt capacity when acceleration is a predetermined value or more.

When a car navigation system is mounted on the vehicle and a road surface on which the vehicle is currently traveling is determined as a bad road from map information and GPS positioning information of the car navigation system, it may be similarly determined as YES in the step S50 by predicting that input torque can exceed a belt capacity.

When input torque is detected or predicted as exceeding a belt capacity, the process moves onto step S60. Otherwise, the process moves onto step S70.

In the step S60, the controller 12 sets an opening degree of the first accumulator valve 112 to the maximum (i.e. 100%) and restricts an opening degree of the second accumulator valve 113 (e.g. to 50%).

By such a control, an oil pressure accumulated in the accumulator 120 is supplied more to the variator 20 via the oil passage 110 and an oil pressure supplied to the auxiliary transmission mechanism 30 is restricted. Therefore, a belt capacity is increased in the variator 20 and an H/C capacity is reduced in the auxiliary transmission mechanism 30 in order to prevent the belt 23 from slipping due to input torque.

In the step S70, the controller 12 restricts an opening degree of the first accumulator valve 112 (e.g. to 50%) and sets an opening degree of the second accumulator valve 113 to the maximum (i.e. 100%). Restriction of opening degrees in the step S60 and the step S70 may be realized by closing the valves and setting opening degrees to zero instead of reducing opening degrees relative to the maximum opening degree. Opening degrees may also be controlled variably based on operations of the variator 20 and the auxiliary transmission mechanism 30.

By such a control, an oil pressure supplied to the auxiliary transmission mechanism 30 is increased in a range without causing slippage of the belt 23 and a control allowance is made larger, whereby enabling a control to follow a behavior change of the vehicle which decelerates and stops due to a coast stop.

After processing the step S60 or the step S70, the process moves onto step S80, wherein the controller 12 determines whether or not a coast stop should be finished because the aforementioned coast stop conditions are not met.

When the coast stop state is established and a coast stop is continued, the process returns to the step S40 to repeat processing the steps S40 to S70. When it is determined to finish the coast stop state, the coast stop state is released and the engine 1 is driven to start a drive by a driving force of the engine. Thereafter, processing made by this flowchart is finished to return to other processes.

By such a control, it is realized to prevent a belt capacity of the variator 20 from falling under an H/C capacity of the auxiliary transmission mechanism 30 in a coast stop.

Figure 7:
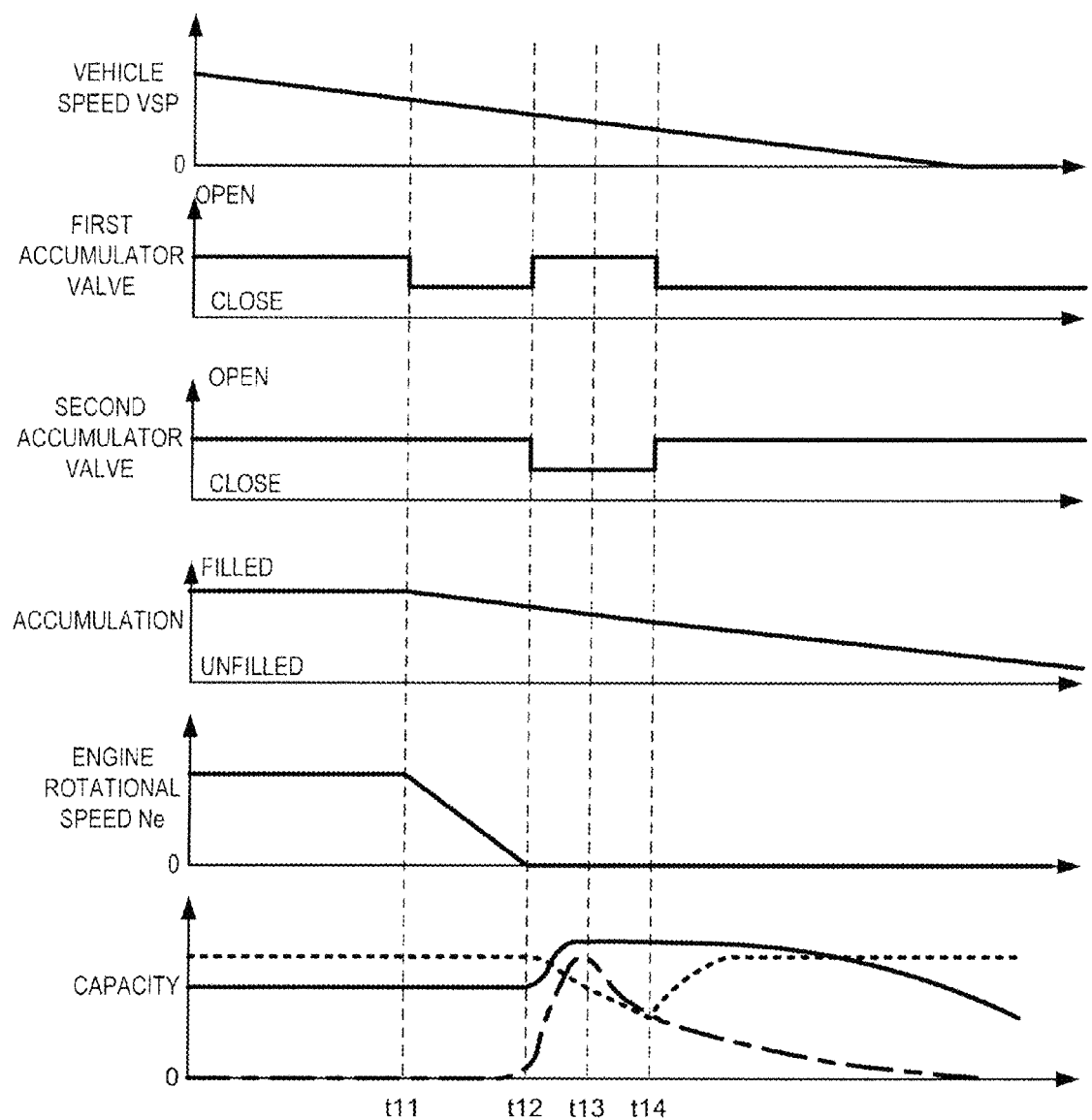
FIG. 7 is an explanatory diagram of the coast stop control according to the embodiment of the present invention.

FIG. 7 is an explanatory diagram of the coast stop control according to the embodiment of the present invention.

FIG. 7 shows, from the top, the vehicle speed VSP, an opening degree of the first accumulator valve 112, an opening degree of the second accumulator valve 113, an accumulation state of the accumulator 120, the engine rotational speed Ne and the relationship among a belt capacity, an H/C capacity and input torque.

In the graph showing the relationship among a belt capacity, an H/C capacity and input torque, a solid line refers to a belt capacity of the belt 23, a broken line refers to an H/C capacity of the high clutch 33 and a one-dot chain line refers to input torque.

Coast stop controlling corresponds to a period from a point of time at which a command to stop rotation of the engine 1 is outputted while the vehicle is traveling (i.e. timing t11 in FIG. 7) to a halt of the vehicle (or the vehicle speed VSP becomes zero).

In FIG. 7, the coast stop conditions are met at timing t11 (i.e. Yes in step S30 shown in FIG. 6) and execution of a coast stop starts (i.e. step 40 shown in FIG. 6). It is assumed that the accumulator 120 has been filled at the timing t11 or before.

At the timing t11, determination in the step S50 shown in FIG. 6 is made. When it is determined that input torque does not exceed a belt capacity, an opening degree of the first accumulator valve 112 is restricted in the step S70 shown in FIG. 6. In this case, an oil pressure of the accumulator 120 is supplied to the oil passage 110 and an oil pressure is supplied more to the auxiliary transmission mechanism 30 than the variator 20. Therefore, a fastening pressure of the auxiliary transmission mechanism 30 is controlled in a range without causing slippage of the belt 23.

In contrast, when it is determined at timing t12 that input torque increased resulting from, for example, stepping on a brake pedal and exceeds a belt capacity, an opening degree of the first accumulator valve 112 is set to the maximum and an opening degree of the second accumulator valve 113 is restricted in the step S60 shown in FIG. 6. In this case, an oil pressure of the accumulator 120 is supplied more to the variator 20. Therefore, a belt capacity of the belt 23 is increased and an H/C capacity of the auxiliary transmission mechanism 30 is decreased.

At this time, even if input torque is further increased at timing t13, an increased belt capacity in excess of an H/C capacity causes the high clutch 33 to slip in an earlier stage in response to input torque. As a result, the belt 23 is prevented from slipping.

Thereafter, when it is determined in the determination in the step S50 shown in FIG. 6 that input torque does not exceed a belt capacity, an opening degree of the second accumulator valve 113 is set to the maximum and an opening degree of the first accumulator valve 112 is restricted in the step S70 shown in FIG. 6, whereby a fastening pressure of the auxiliary transmission mechanism 30 is controlled in a range without causing slippage of the belt 23 (at timing t14).

Because an oil pressure of the accumulator 120 is supplied to the oil passage, accumulation of the accumulator 120 decreases gradually at timing 11 and thereafter.

Thus, according to the embodiment of the present invention, the hydraulic control circuit 11 is provided with the accumulator 120 in the vehicle in which a coast stop is carried out to suspend the engine 1 in a coast state. In this configuration, when the engine 1 stops and an oil pressure supplied from the mechanical oil pump 10m is suspended, an oil pressure of the accumulator 120 is supplied to the oil passage 110.

In this control, when torque is inputted to the transmission 4, opening degrees of the first accumulator valve 112 and the second accumulator valve 113 are controlled. To be more specific, by restricting an opening degree of the second accumulator valve 113 which distributes an oil pressure to the auxiliary transmission mechanism 30, an oil pressure of the variator 20 is controlled to increase. By such a control, a belt capacity is controlled to exceed a capacity of the friction engagement elements and slippage of the belt 23 in response to input torque is suppressed.

As stated above, the vehicle according to the first embodiment of the present invention is provided with the hydraulic control circuit 11 including the variator 20 which is capable of changing a speed ratio by changing a winding diameter of the belt 23 held by oil pressures supplied to the hydraulic cylinder 23a and 23b of the primary pulley 21 and the secondary pulley 22, respectively, the mechanical oil pump 10m driven by the engine 1 in order to supply an oil pressure to the oil passage 110, the accumulator 120 serving as a hydraulic auxiliary unit capable of supplying an accumulated oil pressure to the oil passage, and the control valves (i.e. the first accumulator valve 112 and the second accumulator valve 113) for supplying at least one of oil pressures of the mechanical oil pump 10m and the accumulator 120 to each of the pulleys of the variator 20.

The controller 12 executes a coast stop control to stop the engine 1 while traveling and allows, in the coast stop control, supply of an oil pressure of the accumulator 120 from the oil passage 110 to each of the pulleys.

In such a configuration, when the controller 12 controls, in response to detection or prediction of an increase of input torque inputted to the transmission 4, opening degrees of the first accumulator valve 112 and the second accumulator valve 113 so as to supply an oil pressure of the accumulator 120 to each of the pulleys.

By making such a control, in response to an increase of input torque, an oil pressure is controlled to increase in the variator 20 in order to control a belt capacity to exceed a capacity of the friction engagement elements, whereby realizing prevention of slippage of the belt 23 in response to increased input torque.

In making a coast stop control on condition that the accumulator 120 is filled with an oil pressure, it is configured to supply an oil pressure of the accumulator 120 to the oil passage 110 when an increase of input torque is detected or predicted. Therefore, an oil pressure of the accumulator 120 is not consumed unless it is necessary and reducing the frequency of making a cost stop control for the engine 1 can be suppressed, whereby fuel performance of the engine 1 can be improved.

The auxiliary transmission mechanism 30 having the friction engagement elements for allowing transmission of a driving force of the engine 1 to the driving wheels 7 continuously is arranged in series to the variator 20 and the controller 12 executes a control to distribute an oil pressure supplied to each of the pulleys and an oil pressure supplied to the friction engagement elements. That is, when input torque increases while supplying an oil pressure to the friction engagement elements, opening degrees of the first accumulator valve 112 and the second accumulator valve 113 are controlled so that each of the pulleys has a higher oil pressure than the friction engagement elements.

By making such a control, a fastening force can be maintained without releasing the friction engagement elements in making a coast stop control, whereby a fastening shock occurring in such an occasion as, for example, restarting after the vehicle came to a halt can be suppressed in the friction engagement elements. It is also possible to shorten a period of time required to refasten the friction engagement elements at the restart (i.e. start lag).

In the hydraulic control circuit 11, the oil passage 110 is provided with the check valve 111 for preventing a backflow of an oil pressure from each of the pulleys to the mechanical oil pump 10m.

By such a configuration, an outflow of an oil pressure from the oil passage 110 to the mechanical oil pump 10m is prevented to allow supply of an oil pressure of the accumulator 120 to each of the pulleys or the friction engagement elements.

The controller 12 allows supply of an oil pressure of the accumulator 120 to the friction engagement elements in no detection or prediction of torque inputted to the transmission 4.

By making such a control, when input torque is not detected in making a coast stop control, an oil pressure is supplied to the friction engagement elements to maintain a fastening force without releasing the friction engagement elements. Therefore, in such an occasion as, for example, restarting after the vehicle came to a halt, a fastening shock can be suppressed in the friction engagement elements. It is also possible to shorten a period of time required to refasten the friction engagement elements at restart (i.e. start lag).

The controller 12 supplies an oil pressure of the accumulator 120 to the friction engagement elements when the vehicle comes to a halt.

By making such a control, when input torque is not detected in making a coast stop control, an oil pressure is supplied to the friction engagement elements to maintain a fastening force without releasing the friction engagement elements. Therefore, in such an occasion as restarting after the vehicle came to a halt for example, a fastening shock can be suppressed in the friction engagement elements. It is also possible to shorten a period of time required to refasten the friction engagement elements at the restart (i.e. start lag).

When a force of each of the pulleys to fasten the belt (i.e. belt capacity) is larger than a fastening force of the friction engagement elements (H/C capacity), the controller 12 prohibits supply of an oil pressure of accumulator 120 to the variator 20 even if an increase of torque inputted to the transmission 4 is detected or predicted. That is, if a belt capacity exceeds a capacity of the friction engagement elements, it is unnecessary to control the first accumulator valve 112 and the second accumulator valve 113 so that an oil pressure of each of the pulleys becomes higher than an oil pressure of the friction engagement elements.

By making such a control, the first accumulator valve 112 and the second accumulator valve 113 are prevented from operating unless it is necessary, so that abrasion of components to constitute the first accumulator valve 112 and the second accumulator valve 113 can be suppressed.

Since the hydraulic auxiliary unit is composed of the accumulator for accumulating an oil pressure, the hydraulic auxiliary unit can be formed in a simple structure and an increase of costs of parts and manufacturing costs of the vehicle can be suppressed.

The hydraulic auxiliary unit may also be composed of the electric oil pump 10e in place of the accumulator 120. That is, as long as the electric oil pump 10e can provide a sufficient capacity to ensure a belt capacity and an H/C capacity in suspension of the engine 1, it is possible to prevent slippage of the belt 23 and hold a fastening force of the friction engagement elements by using an oil pressure of the electric oil pump 10e in a coast stop control.

The electric oil pump 10e and the accumulator 120 may also be prepared to provide a configuration of supplying an oil pressure. It is therefore possible to prevent slippage of the belt 23 and hold a fastening force of the friction engagement elements in a coast stop control.

Next, a second embodiment of the present invention will be explained.

Figure 8:
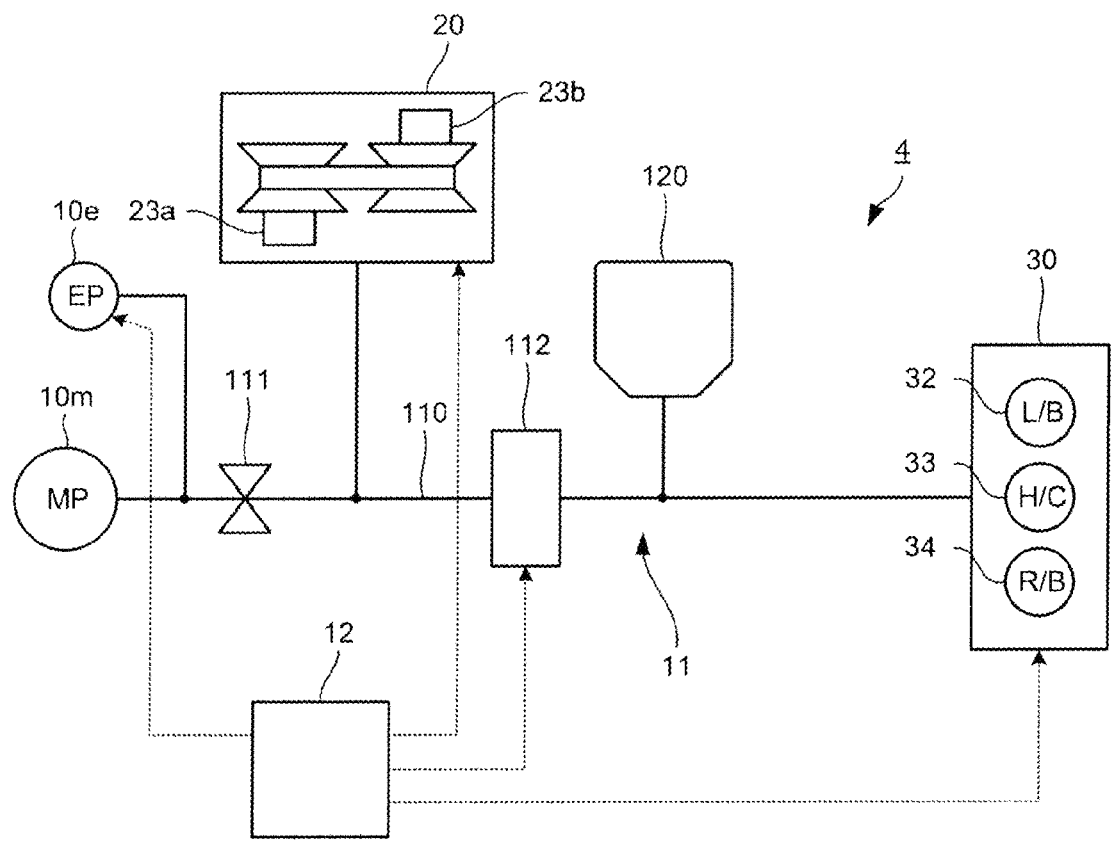
FIG. 8 is an explanatory diagram of a transmission including a hydraulic control circuit according to a second embodiment of the present invention.

FIG. 8 is an explanatory diagram of the transmission 4 including the hydraulic control circuit 11 according to the second embodiment of the present invention. Same reference numbers refers to same elements shown in the first embodiment and explanation thereof will be omitted. A basic configuration of the second embodiment is similar to that of the first embodiment as shown in FIG. 1 and FIG. 2.

In the second embodiment, the oil passage 110 is provided with the first accumulator valve 112 and the second accumulator valve 113 is omitted.

In such a configuration, a control similar to that of the aforementioned first embodiment is executed.

In the flowchart shown in FIG. 6, an opening degree of the first accumulator valve 112 is set to the maximum in the step S10. At this time, there is no valve corresponding to the second accumulator valve and a state similar to setting the second accumulator valve 113 to the maximum as shown in the first embodiment is realized.

Thereafter, in making a coast stop control, when input torque is predicted as exceeding a belt capacity in the determination in step S50, the process moves onto step S60.

In the step S60, the controller 12 maintains an opening degree of the first accumulator valve 112 to the maximum. By such a control, an oil pressure accumulated in the accumulator 120 is supplied to the variator 20 and the auxiliary transmission mechanism 30 via the oil passage 110. Therefore, a belt capacity in the variator 20 can be increased. In the auxiliary transmission mechanism 30, the controller 12 controls a fastening force of the high clutch 33 so that an H/C capacity falls under a belt capacity. Therefore, slippage of the belt 23 due to input torque is prevented.

When it is not predicted in the determination in the step S50 that input torque exceeds a belt capacity, the process moves onto step S70.

In the step S70, the controller 12 restricts an opening degree of the first accumulator valve 112 (e.g. to 50%). By such a control, an oil pressure supplied to the auxiliary transmission mechanism 30 is increased in a range without causing slippage of the belt 23 and a control allowance is made larger, whereby enabling a control to follow a behavior change of a hybrid vehicle which decelerates and stops due to a coast stop.

Thus, the oil passage 110 may be provided with the first accumulator valve 112 serving as only one control valve to restrict supply of an oil pressure of the accumulator 120 to the variator 20. Even in such a configuration, operation and effects similar to those of the aforementioned first embodiment can be exhibited.

Next, a third embodiment of the present invention will be explained.

Figure 9:
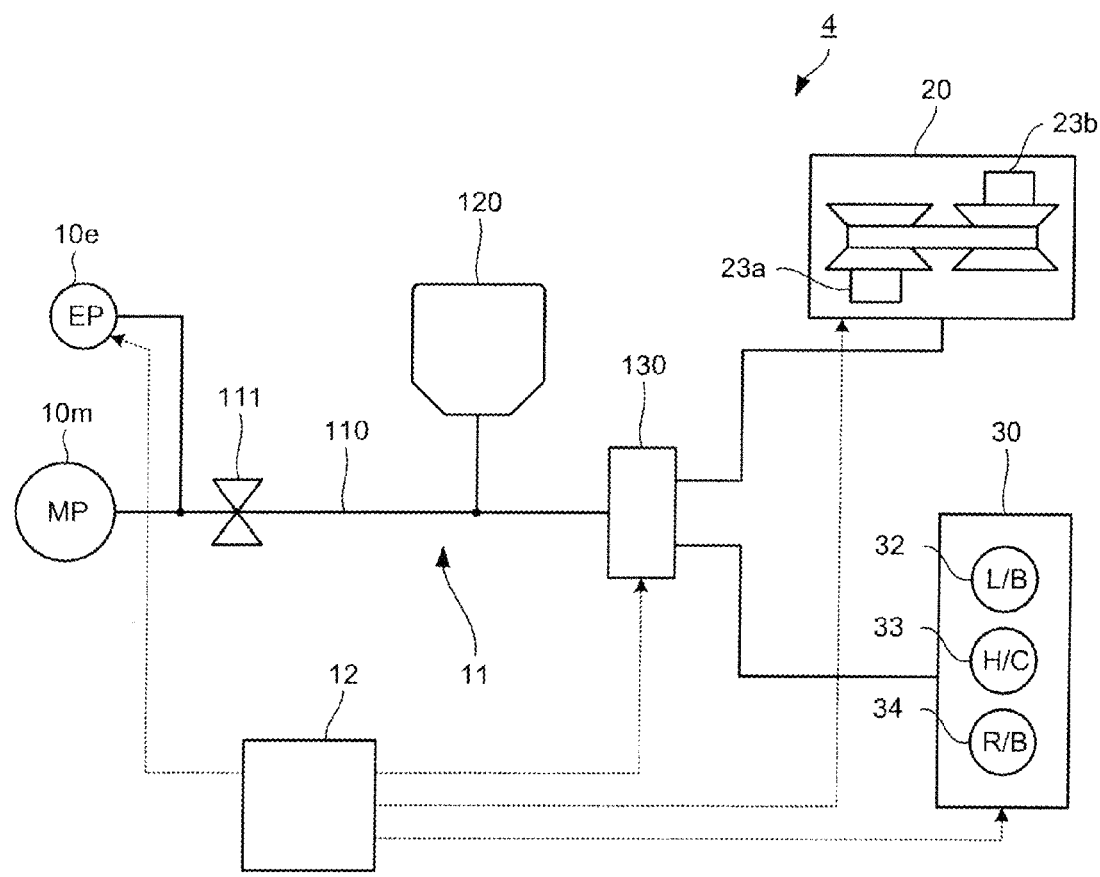
FIG. 9 is an explanatory diagram of a transmission including a hydraulic control circuit according to a third embodiment of the present invention.

FIG. 9 is an explanatory diagram of the transmission 4 including the hydraulic control circuit 11 according to the third embodiment of the present invention. Same reference numbers refer to same elements shown in the first embodiment and explanation thereof will be omitted. A basis configuration of the third embodiment is similar to that of the first embodiment as shown in FIG. 1 and FIG. 2.

In the third embodiment, the oil passage 110 is provided with a selector valve 130 in place of the first accumulator valve 112 and the second accumulator valve 113 as stated above.

The selector valve 130 is interposed between a side on which the mechanical oil pump 10m and the accumulator 120 are arranged and a side on which the variator 20 and the auxiliary transmission mechanism 30 are arranged in the oil passage 110. The selector valve 130 is configured so that an oil pressure supplied from the mechanical oil 10*m* or the accumulator 120 can be distributed to the variator 20 and the auxiliary transmission mechanism 30 according to predetermined distribution.

That is, the selector valve 130 is a three-way valve having one input and two outputs and configured to allow a control of distribution of an oil pressure outputted from each of the two outputs according to, for example, a duty ratio of a solenoid valve.

In such a configuration, a control similar to that of the aforementioned first embodiment is executed.

In the flowchart shown in FIG. 6, the controller 12 switches the selector valve 130 in step S10 so that each of the variator 20 and the auxiliary transmission mechanism 30 is set to have a maximum output. Therefore, a state similar to setting an opening degree of the first accumulator valve 112 and an opening degree of the second accumulator valve 113 to the maximum as shown in the first embodiment can be realized.

In a coast stop control thereafter, when input torque is predicted as exceeding a belt capacity in the determination of the step S50, the process moves onto step S60.

In the step S60, the controller 12 switches the selector valve 130 so as to set an output of the variator 20 to the maximum and restrict an output of the auxiliary transmission mechanism 30. By such a control, an oil pressure accumulated in the accumulator 120 is supplied more to the variator 20 via the oil passage 110 and an oil pressure supplied to the auxiliary transmission mechanism 30 is restricted.

Therefore, a belt capacity is increased in the variator 20 and an H/C capacity is decreased in the auxiliary transmission mechanism 30 to prevent slippage of the belt 23 due to input torque.

In no prediction of input torque in excess of a belt capacity in the determination of step S50, the process moves onto step S70.

In the step S70, the controller 12 switches the selector valve 130 so that an output of the variator 20 is restricted and an output of the auxiliary transmission mechanism 30 is set to the maximum. By such a control, an oil pressure supplied to the auxiliary transmission mechanism 30 is increased in a range without causing slippage of the belt 23 and a control allowance is made larger, whereby enabling a control to follow a behavior change of the vehicle which decelerates and stops due to a coast stop.

Thus, even with the selector valve 130 provided in the oil passage 110 so as to supply an oil pressure of the accumulator 120 to each of the variator 20 and the auxiliary transmission mechanism 30, operation and effects similar to those of the aforementioned first embodiment can be exhibited.

Although the embodiments of the present invention are as explained above, each of the above embodiments is merely one of application examples of the present invention and is not provided for the purpose of limiting the technical scope of the present invention to the concrete configurations of the above embodiments.

For example, even though the variator 20 is provided as a v-belt continuously variable transmission mechanism in the above embodiments, the variator 20 may also be a continuously variable transmission mechanism with a chain wound around the pulleys 21 and 22 in place of the belt 23. Alternatively, the variator 20 may also be a toroidal-type continuously variable transmission mechanism in which a tiltable power roller is arranged between an input disk and an output disk.

Although the auxiliary transmission mechanism 30 is a transmission mechanism having two forward shift stages including the first speed and the second speed in the above embodiments, the auxiliary transmission mechanism 30 may also be a transmission mechanism having three or more forward shift stages.

Although the auxiliary transmission mechanism 30 is configured by using a Ravigneaux-type planetary gear mechanism, there is no limitation on such a configuration. For example, the auxiliary transmission mechanism 30 may be configured by combining a common planetary gear mechanism and a friction engagement element or may also be configured by a plurality of power transmission paths composed of a plurality of gear trains with different speed ratios and a friction engagement element for switching these power transmission paths.

The auxiliary transmission mechanism 30 may be disposed in either a front stage or a rear stage relative to the variator 20. For example, if the auxiliary transmission mechanism 30 is disposed in a rear stage to the engine 1 and a front stage to the variator 20, it is particularly effective to cope with shock torque received from the engine 1. In contrast, if the auxiliary transmission mechanism 30 is disposed in a rear stage to the variator 20, it is particularly effective to cope with shock torque received from the driving wheels 7. Furthermore, in place of the auxiliary transmission mechanism 30 having a shift stage, a forward/reward switch mechanism may also be used.

This invention is not limited to the embodiment described above, and naturally includes various modifications and improvements within the scope of the technical spirit thereof.

This application claims priority from Japanese Patent Application No. 2012-75021 filed Mar. 28, 2012, which is incorporated herein by reference.

What we claimed is:

1. A control device for continuously variable transmission, being mounted on a vehicle and provided with a continuously variable transmission mechanism for controlling a speed ratio by changing a winding diameter of a belt held by an oil pressure supplied to pulleys, comprising:

a hydraulic control circuit including a hydraulic pump driven by a driving power source in order to supply an oil pressure to a hydraulic circuit, a hydraulic auxiliary unit for supplying an accumulated oil pressure to the hydraulic circuit, and a control valve for supplying at least one of oil pressures of the hydraulic pump and the hydraulic auxiliary unit to the pulleys; and a control unit adapted to execute a coast stop control to stop the driving power source while travelling and control, during the coast stop control, upon detection or prediction of an increase of torque inputted to the continuously variable transmission mechanism, the control valve so as to supply an oil pressure of the hydraulic auxiliary unit to the pulleys and increase an oil pressure in the pulleys.

2. The control device for continuously variable transmission according to claim 1, wherein:

friction engagement elements connected to the continuously variable transmission are provided to allow transmission of a driving force of the driving power source to driving wheels continuously; and the control valve supplies at least one of oil pressure of the hydraulic pump and the hydraulic auxiliary unit so as to distribute an oil pressure supplied to the pulleys and an oil pressure supplied to the friction engagement elements.

3. The control device for continuously variable transmission according to claim 2, wherein
the control unit is adapted to control the control valve, in no detection or prediction of torque inputted to the continuously variable transmission mechanism, supply an oil pressure of the hydraulic auxiliary unit to the friction engagement elements.

4. The control device for continuously variable transmission according to claim 2, wherein
the control unit is adapted to control the control valve, in response to the vehicle coming to a halt, so as to supply an oil pressure of the hydraulic auxiliary unit to the friction engagement elements.

5. The control device for continuously variable transmission according to claim 1, wherein
the hydraulic circuit has a check valve for preventing a backflow of an oil pressure supplied from the pulleys of the continuously variable mechanism to the hydraulic pump.

6. The control device for continuously variable transmission according to claim 1, wherein the control unit is adapted to execute no control of the control valve to supply an oil pressure of the hydraulic auxiliary unit to the pulleys, upon determination of a force to hold the belt by the pulleys in excess of a fastening force of the friction engagement elements, even with detection or prediction of an increase of torque inputted to the continuously variable transmission mechanism.

7. The control device for continuously variable transmission according to claim 1, wherein
the hydraulic auxiliary unit comprises an accumulator for accumulating an oil pressure.

8. The control device for continuously variable transmission according to claim 1, wherein
the hydraulic auxiliary unit comprises an electric oil pump.

9. The control device for continuously variable transmission according to of claim 1, wherein
the hydraulic auxiliary unit comprises an electric oil pump and an accumulator for accumulating an oil pressure.

10. A control method for continuously variable transmission for controlling a speed ratio by changing a winding diameter of a belt held by an oil pressure supplied to pulleys having a hydraulic control circuit including a hydraulic pump driven by a driving power source in order to supply an oil pressure to a hydraulic circuit, a hydraulic auxiliary unit for supplying an accumulated oil pressure to the hydraulic circuit, and a control valve for supplying at least one of oil pressures of the hydraulic pump and the hydraulic auxiliary unit to the pulleys comprising:
executing a coast stop control to stop the driving power source while travelling and controls, during the coast stop control, upon detection or prediction of an increase of torque inputted to the continuously variable transmission mechanism, the control valve so as to supply an oil pressure of the hydraulic auxiliary unit to the pulleys and increase an oil pressure in the pulleys.

11. A control device for continuously variable transmission, being mounted on a vehicle and provided with a continuously variable transmission mechanism for controlling a speed ratio by changing a winding diameter of a belt held by an oil pressure supplied to pulleys, comprising:
a hydraulic control circuit including a hydraulic pump driven by a driving power source in order to supply an oil pressure to a hydraulic circuit, a hydraulic auxiliary unit for supplying an accumulated oil pressure to the hydraulic circuit, and a control valve for supplying at least one of oil pressures of the hydraulic pump and the hydraulic auxiliary unit to the pulleys; and
control means for execute a coast stop control to stop the driving power source while travelling and controls, during the coast stop control, upon detection or prediction of an increase of torque inputted to the continuously variable transmission mechanism, the control valve so as to supply an oil pressure of the hydraulic auxiliary unit to the pulleys and increase an oil pressure in the pulleys.

* * * * *